United States Patent [19]

Kita et al.

[11] Patent Number: 4,750,381
[45] Date of Patent: Jun. 14, 1988

[54] HYDROMECHANICAL TRANSMISSION

[75] Inventors: Yasuo Kita, Kyoto; Yoshihiko Nakakoji, Otsu, both of Japan

[73] Assignee: Shimadzu Corporation, Kyoto, Japan

[21] Appl. No.: 921,091

[22] Filed: Oct. 21, 1986

[51] Int. Cl.[4] ............................................. F16H 47/04
[52] U.S. Cl. .......................................... 74/687; 74/720
[58] Field of Search ................ 74/687, 677, 681, 720, 74/720.5, 718

[56] References Cited

U.S. PATENT DOCUMENTS

| | | | |
|---|---|---|---|
| 3,714,845 | 2/1973 | Mooney, Jr. | 74/687 |
| 3,722,324 | 3/1973 | Cordner et al. | 74/687 |
| 3,903,755 | 9/1975 | Polak | 74/687 |
| 3,979,972 | 9/1976 | Sakai et al. | 74/687 |
| 4,286,477 | 9/1981 | Meyerle et al. | 74/687 |
| 4,304,151 | 12/1981 | Meyerle et al. | 74/687 |
| 4,306,467 | 12/1981 | Pollman | 74/687 |
| 4,313,351 | 2/1982 | Hagin | 74/687 |
| 4,341,131 | 7/1982 | Pollman | 74/687 |
| 4,341,132 | 7/1982 | Burdick | 74/687 |
| 4,446,756 | 5/1984 | Hagin et al. | 74/687 |
| 4,491,034 | 1/1985 | Fredriksen | 74/687 |

Primary Examiner—Lawrence Staab
Assistant Examiner—David Novais
Attorney, Agent, or Firm—Armstrong, Nikaido, Marmelstein & Kubovcik

[57] ABSTRACT

A hydromechanical transmission that can be used as an efficient, continuously variable transmission has a differential mechanism, a hydraulic transmission mechanism, a mode selector mechanism, a locking mechanism, and a clutch mechanism. The hydraulic transmission mechanism has two pump/motors one of which acts as a hydraulic pump when the other serves as a hydraulic motor, and vice-versa. The mode selector establishes either a low-speed more or a high-speed mode. When one of the two pump/motors operates at a low speed in a given range of higher speeds in the high-speed mode, the input/output shaft of the pump/motor is locked by the locking mechanism. When the locking mechanism is in operation, the other pump/motor operating at a higher speed is disconnected from the differential mechanism by the clutch mechanism.

4 Claims, 3 Drawing Sheets

HYDROMECHANICAL TRANSMISSION

FIELD OF THE INVENTION

The present invention relates to a hydromechanical transmission which can be used in various industrial fields as an efficient continuously variable transmission.

BACKGROUND OF THE INVENTION

A hydrostatic power transmission which uses hydraulic pump/motors and is employed as a continuously variable transmission has been known. This transmission has the advantage that speed can be continuously varied. However, it does not always have a high efficiency. Further, the range of speeds is not satisfactorily broad. Accordingly, a hydromechanical transmission (HMT) has been developed in which such a hydrostatic power transmission (HST) is used in conjunction with differential gearing. In such a transmission, the function of the transmission of power is divided between the HST and the differential gearing in order to achieve a high transmission efficiency of the gearing as well as the continuous variableness of the HST. See Chieo Ishihara: "Hydrodynamic Engineering," Asaka-shobo, Japan, and Sadao Ishihara: "Theory and Practice of Piston Pump Motor," Corona-sha, Japan. Also, the present inventor and others are developing a simple HMT as shown in FIG. 3. This HMT and the conventional HMT are so designed to change the displacements of a hydraulic pump/motor and to switch the transmission between low-speed and high-speed modes, for attaining high efficiency over broad ranges of speeds. However, these HMTs suffer from a deterioration in efficiency in the high-speed mode as described later.

SUMMARY OF THE INVENTION

It is an object of the present invention to provide a hydromechanical transmission which is equipped with a mode selector mechanism as mentioned above and also with a simple mechanism that can effectively prevent efficiency from deteriorating in a high-speed mode.

It is another object of the invention to provide a hydromechanical transmission which prevents its hydraulic pump/motors from being rotated undesirably at high speeds in the high-speed mode, thereby solving various problems including a decrease in the lifetime of the machine and the generation of heat and noise.

These objects are achieved in accordance with the teachings of the invention by a hydromechanical transmission comprising: a differential mechanism having first, second, third input/output ends and forming either a first mechanical transfer line for low velocities between the first and second input/output ends or a second mechanical transfer line for high velocities between the first and third input/output ends; a hydraulic power transmission mechanism having two devices one of which acts as a hydraulic pump when the other serves as a hydraulic motor and vice versa, the input/output shaft of one of the devices being connected to the second input/output end of the differential mechanism, the input/output shaft of the other being connected to the third input/output end, the two devices cooperating to constitute continuously variable speed hydraulic power transmission lines; a mode selector mechanism for establishing either a low-speed mode, in which the output is connected to the input via the first mechanical transfer line, or a high-speed mode, in which the output is connected to the input via the second mechanical transfer line; and a locking mechanism for locking the input/output shaft of the device, working at a low speed in a certain range of high speeds, in the high-speed mode.

The object mentioned secondly is achieved by the addition of a clutch mechanism to the hydromechanical transmission described above. The clutch mechanism acts to disconnect the input/output shaft of the pump/motor operating at a higher velocity from the differential mechanism when the locking mechanism is in operation.

In the low-speed mode, the output is connected to the input via the first mechanical transfer line for low velocities, the line being formed between the first and second input/output ends of the differential mechanism. A portion of the applied power is delivered through this line. The remaining power is conveyed to the output via the hydraulic power transmission line formed by the hydraulic power transmission mechanism. In this case, one of the two devices acts as a motor, while the other serves as a pump.

In the high-speed mode, the output is connected to the input via the second mechanical transfer line for high velocities, the line being formed between the first and third input/output ends of the differential mechanism. A portion of the applied power is delivered through this mechanical transfer line. The remaining power is conveyed to the output via the hydraulic power transmission line formed by the hydraulic power transmission mechanism. At this time, the roles of the two devices, i.e., the hydraulic pump/motors, are interchanged. When the high-speed mode is selected and the locking mechanism is operated in a given range of high speeds, the input/output shaft of the device acting as a pump is locked, and all of the applied power is delivered through the mechanical transfer line. Thus, the function of the hydraulic power transmission mechanism completely ceases. In this case, if the clutch mechanism is changed to its non-transmission position where the input/output shaft of the pump/motor operating at a higher speed is mechanically disconnected from the differential mechanism, then this device is kept from idling at a high speed.

Other objects and features of the invention will appear in the course of description that follows.

DETAILED DESCRIPTION OF THE INVENTION

Figure 1:
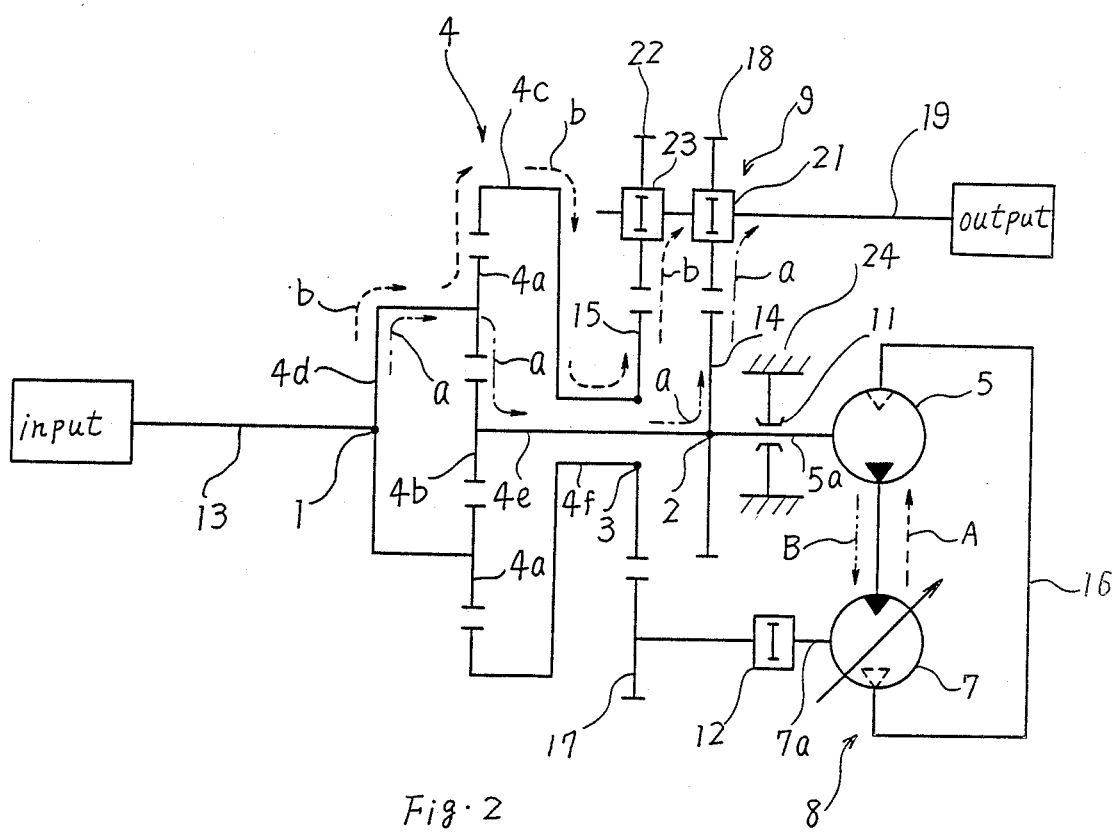
FIG. 1 is a flow line diagram of a hydromechanical transmission according to the instant invention.
Figure 2:
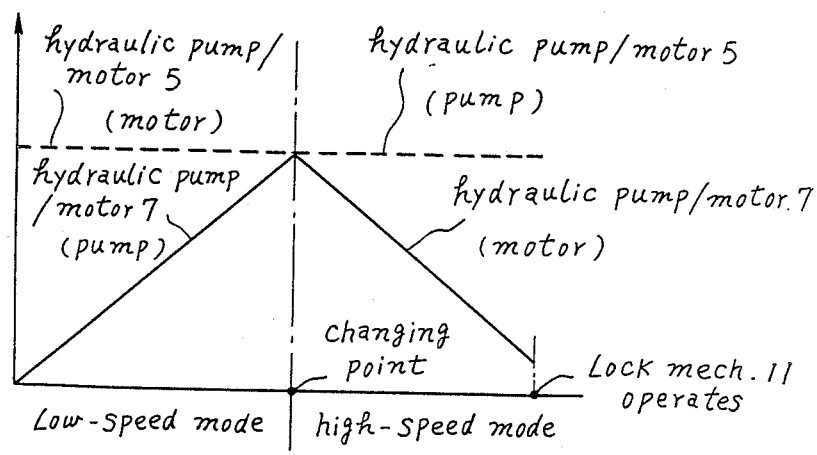
FIG. 2 is a graph for illustrating the operation of the transmission shown in FIG. 1.

A hydromechanical transmission according to the instant invention is schematically shown in FIG. 1. This transmission has a differential mechanism 4, a hydraulic power transmission mechanism 8, a mode selector mechanism 9, a locking mechanism 11, and a clutch mechanism 12. The differential mechanism 4 has first, second, third input/output ends 1,2,3, respectively, and forms either a first mechanical transfer line a for low velocities between the first end 1 and the second end 2 or a second mechanical transfer line b for high velocities between the first end 1 and the third end 3. The hydraulic power transmission mechanism 8 has a fixed-displacement hydraulic pump/motor 5 and a variable-displacement hydraulic pump/motor 7. The input/output shaft 5a of the device 5 is connected to the second input/output end 2. The input/output shaft 7a of the device 7 is coupled to the third input/output end 3. The device 7 is coupled to the third input/output end 3. The devices 5 and 7 cooperate to constitute continuously variable hydraulic transmission lines A and B. The mode selector mechanism 9 establishes either a low-speed mode, in which the output is connected to the input via the first mechanical transfer line a, or a high-speed mode, in which the output is connected to the input via the second mechanical transfer line b. The locking mechanism 11 acts to lock the input/output shaft 5a of device 5. When the locking mechanism 11 is in operation, the input/output shaft 7a of the other device 7 is disconnected from the differential mechanism 4 by the clutch mechanism 12.

The differential mechanism 4 is a planetary gear train consisting of planet gears 4a circumferentially and regularly spaced apart from one another and a sun gear 4b disposed inside the planet gears 4a. The planet gears 4a are in mesh with an outside ring gear 4c. The planet gears 4a are held by a gear retainer 4d. The aforementioned first input/output end 1 is provided at the center of retainer 4d. An input shaft 13 is mounted to first input/output end 1. The sun gear 4b is supported on a shaft 4e, which is used as the second input/output end 2. A gear 14 is securely fixed to the second end 2. The ring gear 4c has a boss 4f that is used as the third input/output end 3. A gear 15 is coupled to the third end 3.

In the hydraulic power transmission mechanism 8, the fixed-displacement pump motor 5 is connected in series with the variable-displacement pump/motor 7 via a hydraulic circuit 16, in the same manner as in an ordinary hydrostatic power transmission. The input/output shaft 5a of the pump/motor 5 is coupled to the shaft 4e of the sun gear 4b. The input/output shaft 7a of the pump/motor 7 is connected to the ring gear 4c via a gear 17.

The mode selector mechanism 9 has a low-velocity clutch 21 inserted between a low-velocity gear 18 and the output shaft 19 of the transmission. The gear 18 meshes with gear 14 at the second input/output end 2. The mechanism 9 further has a high velocity clutch 23 inserted between a high-velocity gear 22 and the output shaft 19, the gear 22 engaging with gear 15 at the third input/output end 3.

The locking mechanism 11 acts to lock the input/output shaft 5a of the pump/motor 5 when device 5 is running at a very low speed in a given range of high speeds in the high-speed mode, as described later. The mechanism 11 is designed to be capable of connecting and disconnecting the input/output shaft 5a with a stationary member 24. That is, the locking mechanism is similar in structure to ordinary brake mechanisms.

Usually, the clutch mechanism 12 connects the input/output shaft 7a of the pump/motor 7 with gear 17. It disconnects the shaft 7a from gear 17 only when a switching instruction is given to it.

In this example, rotary power from an engine or the like is applied to the input shaft 13 mounted at the first input/output end 1 of the differential mechanism 4. Then, rotary power is delivered from the output shaft 19 which is connected to the second input/output end 2 or the third input/output end 3 of the differential mechanism 4 via the mode selector mechanism 9. The power is then transmitted to the drive wheels of a vehicle or the like.

In the operation of the hydromechanical transmission constructed as described above, when the low-speed mode is selected, the low-speed clutch 21 is engaged but the high-speed clutch 23 is not engaged. Under this condition, the output is connected to the input through the low-speed mechanical transfer line a formed between the first end 1 and the second end 2 of the differential mechanism 4. Thus, a portion of the applied power is transmitted to the output shaft 19 via the mechanical transfer line a. At this time, the variable-displacement pump/motor 7 acts as a pump, while the fixed-displacement pump/motor 5 serves as a motor. Accordingly, the rotary power appearing at the third end 3 of the differential mechanism 4 is conveyed to the output shaft 19 via the hydraulic transmission line A that is formed between the variable-displacement pump/motor 7 and the fixed-displacement pump/motor 5. In this low-speed mode, as the displacement of the pump/motor 7 is increased, the rotational speed of the output shaft 19 increases relative to the rotational speed of the input shaft 13. Specifically, when the displacement of the pump/motor 7, having a variable displacement, is zero, the third input/output end 3 of the differential mechanism 4 runs substantially at idle. Therefore, the output shaft 19 connected to the second input/output end 2 of the differential mechanism 4 is substantially at a standstill. Then as the displacement of the pump/motor 7 is increased, the relative rotational speed at the third end 3 decreases, and the relative rotational speed at the second end 2 increases, until these two speeds are equal. In this state, the clutch 21 of the mode selector mechanism 9 is changed to the clutch 23. That is, the low-speed clutch 21 is disengaged, while the high-speed clutch 23 is engaged to select the high-speed mode.

In this high-speed mode, the mechanical transfer line b is formed between the first end 1 and the third end 3 of the differential mechanism 4. This allows a portion of the applied power to be transmitted to the output shaft 19 via this line b. At this time the variable-displacement pump/motor 7 functions as a motor, whereas the fixed-displacement pump/motor 5 acts as a pump. Thus, the rotary power appearing at the second end 2 of the differential mechanism 4 is transmitted to the output shaft 19 via the hydraulic transmission line B that is formed between the fixed-displacement pump/motor 5 and the variable-displacement pump/motor 7. In this high-speed mode, as the displacement of the pump/motor 7 is reduced, the rotational speed of the output shaft 19 increases relative to the rotational speed of the input shaft 13. In other words, as the displacement of the pump/motor 7 is reduced, the relative speed at the third end 3 increases, while the relative rotational speed at the second end 2 decreases.

Figure 3:
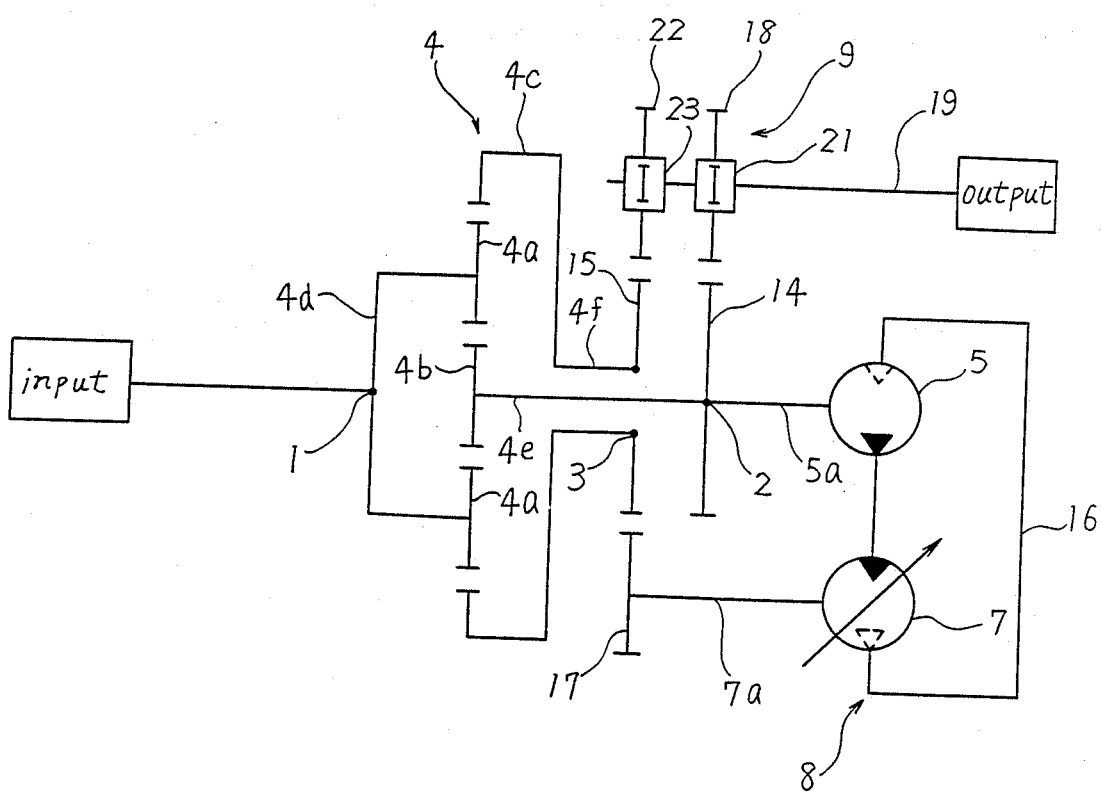
FIG. 3 is a flow line diagram for illustrating a hydromechanical transmission.

The principles of operation described thus far also apply to the transmission shown in FIG. 3 which has been developed by one of the present inventors and is commonly owned. It is to be noted that components are indicated by the same reference numerals throughout FIGS. 1 and 3, and the same components shown in FIG. 3 will not be described hereinafter. As mentioned previously, the transmission shown in FIG. 3 has the problem of a deterioration in efficiency in the high-speed mode. More specifically, in the high-speed mode, if the displacement of the pump/motor 7 is reduced, then the rotational speed of the output shaft 19 will increase relative to the rotational speed of the input shaft 13 as mentioned already. In a range of high speeds where the relative speed of the output shaft 19 approaches its limit, the amount of fluid displaced by the fixed-displacement pump/motor 5 acting as a pump decreases greatly, whereas the variable-displacement pump/motor 7 serving as a motor runs at high speeds with low displacement. At this time, the output from the pump/motor 7 barely shares the actual output from the transmission. In addition, the operation of the hydraulic transmission mechanism 8 causes energy loss, thus causing the efficiency of the whole system to deteriorate.

In contrast, in the transmission shown in FIG. 1, the locking mechanism 11 is operated in the aforementioned range of higher speeds in the high-speed mode to lock the input/output shaft 5a of the fixed-displacement device 5. Further, the clutch mechanism 12 is changed to its disengaged state to disconnect the input/output shaft 7a of the variable-displacement pump/motor 7 from the differential mechanism 4. Therefore, the second input/output end 2, or the sun gear 4b, of the differential mechanism 4 is maintained completely at rest. This allows all the power applied to the input shaft 13 to be directed to the output shaft 19 via the mechanical transfer line b formed between the first end 1 and the third end 3. Under this condition, the hydraulic transmission mechanism 8 comprising the hydraulic pump/motors 5 and 7 is fully disconnected form the differential mechanism 4. Consequently, power is transmitted by means of only mechanical gears 4a, 4c, 15, 22. Hence, the system can be run with very high efficiency, even at high velocities.

The mode selector mechanism 9, the locking mechanism 11, the clutch mechanism 12, etc. are switched to their other states by the use of, for example, a control apparatus, such as a microcomputer, and an actuator or similar device. The control apparatus detects the operating conditions and issues certain instructions to the actuators to operate them.

If the locking mechanism 11 is designed to be capable of operating in a second range, as well as the aforementioned range, then this locking mechanism 11 may be used for a parking brake.

Figure 4:
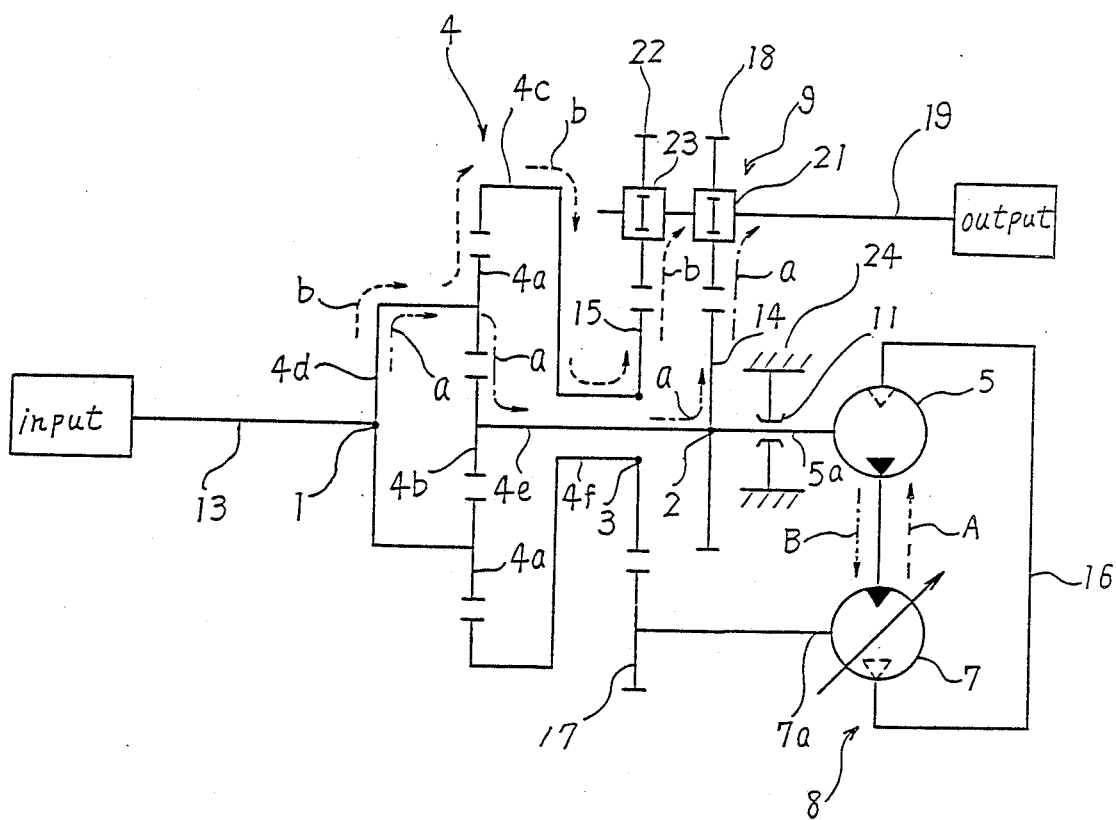
FIG. 4 is a diagram of another embodiment of the instant invention.

In the embodiment shown in FIG. 4, wherein the clutch mechanism of FIG. 1 is excluded, when the locking mechanism is actuated, the second input/output end 2 of the differential mechanism 4 is completely locked, and therefore such an invention is not greatly inferior to the illustrated system of FIG. 1. However, where the clutch mechanism 12 is provided as in the illustrated embodiment of FIG. 1 and it is operated together with the locking mechanism 11 to separate the hydraulic pump/motor 7 from the differential mechanism 4, the pump/motor 7 is prevented from worthlessly running idle. This can also prevent energy loss which would otherwise be caused by viscous resistance encountered during idle. Since the pump/motor 7 does not run idle at high speeds, its durability does not deteriorate, nor does the generation of heat and noise take place. If the clutch mechanism 12 constructed as described above is so designed as to be capable of operating in a second range as well as in the aforementioned range, the mechanism 12 can function also as a neutral clutch that completely disconnects the output from the input.

Although the differential mechanism is not limited to a planetary gearing, the use of such a planetary gearing facilitates making the system compact. Also, the hydraulic transmission mechanism is not limited to the mechanism described above, of course, but rather various changes and modifications may be made thereto without departing from the scope of the invention. For example, both pump/motors 5 and 7 acting as a pump and a motor may be of a variable-displacement type.

Also, in the illustrated embodiment, the differential mechanism is disposed on the input side to divide the input power. The invention is not limited to this structure. For example, it is also applicable to a structure where the output power is divided.

Since the instant transmission is constructed as described thus far, it can be switched between the low-speed and high speed modes. Further, its efficiency at higher speeds in the high-speed mode is improved as compared with a conventional equipped with a mode selecting function. Additionally, the durability and reliability are enhanced, and noise is reduced. In this way, the instant hydromechanical transmission can run with a high efficiency over a wide range of speeds.

We claim:

1. A hydromechanical transmission having an input shaft and an output shaft, comprising:

a differential mechanism having first, second, and third input/output ends and forming either a first mechanical transfer line for low speeds between the first and second input/output ends or a second mechanical transfer line for high speeds between the first and third input/output ends;

a hydraulic power transmission mechanism having two pump/motors one of which acts as a hydraulic pump when the other serves as a hydraulic motor and vice-versa, an input/output shaft of one of the pump/motors being connected to the second input/output end of the differential mechanism, an input/output shaft of the other being connected to the third input/output end, the two pump/motors cooperating to constitute continuously variable speed hydraulic power transmission lines;

a mode selector mechanism for establishing either a low-speed mode, in which the output of the hydromechanical transmission is connected to the input via the first mechanical transfer line, or a high-speed mode, in which the output is connected to the input via the second mechanical transfer line;

and a locking mechanism for locking the input/output shaft of the pump/motor, operating at a low speed in a certain range of high speeds, in the high-speed mode.

2. A hydromechanical transmission having an input shaft and an output shaft comprising:

a differential mechanism having first, second, and third input/output ends and forming either a first mechanical transfer line for low speeds between the first and second input/output ends or a second mechanical transfer line for high speeds between the first and third input/output ends;

a hydraulic power transmission mechanism having two pump/motors one of which acts as a hydraulic pump when the other serves as a hydraulic motor and vice versa, an input/output shaft of one of the pump/motors being connected to the second input/output end of the differential mechanism, an input/output shaft of the other being connected to the third input/output end, the two pump/motors cooperating to constitute continuously variable speed hydraulic power transmission lines;

a mode selector mechanism for establishing either a low-speed mode, in which the output of the hydromechanical transmission is connected to the input via the first mechanical transfer line, or a high-speed mode, in which the output is connected to the input via the second mechanical transfer line;

a locking mechanism for locking the input/output shaft of the pump/motor, acting as a pump in a certain range of high speeds, in the high-speed mode; and a clutch mechanism acting to disconnect the input/output shaft of the pump/motor operating at a higher speed from the differential mechanism when said locking mechanism is in operation.

3. A hydromechanical transmission as set forth in either of claims 1 or 2, wherein said locking mechanism brings the input/output shaft of said pump/motor connected to the second input/output end into and out of engagement with a stationary member.

4. A hydromechanical transmission as set forth in claim 2, wherein the clutch mechanism is mounted between the third input/output end of the differential mechanism and the input/output shaft of the pump/motor connected to the third input/output end.

* * * * *